United States Patent
Zhang et al.

(10) Patent No.: US 12,361,060 B2
(45) Date of Patent: Jul. 15, 2025

(54) VIDEO PROCESSING METHOD AND APPARATUS

(71) Applicant: SHANGHAI BILIBILI TECHNOLOGY CO., LTD., Shanghai (CN)

(72) Inventors: Xiao Zhang, Shanghai (CN); Wenjing Zhang, Shanghai (CN); Jianping Lin, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 286 days.

(21) Appl. No.: 18/082,539

(22) Filed: Dec. 15, 2022

(65) Prior Publication Data

US 2023/0195788 A1 Jun. 22, 2023

(30) Foreign Application Priority Data

Dec. 20, 2021 (CN) .......................... 202111566622.7

(51) Int. Cl.
*G06F 16/783* (2019.01)
*G06F 16/635* (2019.01)
*G06F 16/638* (2019.01)

(52) U.S. Cl.
CPC ........ *G06F 16/7834* (2019.01); *G06F 16/635* (2019.01); *G06F 16/639* (2019.01)

(58) Field of Classification Search
CPC ...... G06F 16/683; G06F 16/68; G06F 3/0482; G06F 16/635
USPC ............................................................ 700/94
See application file for complete search history.

(56) References Cited

U.S. PATENT DOCUMENTS

| | | | |
|---|---|---|---|
| 11,528,571 B1 * | 12/2022 | Liu .................... | G10L 25/21 |
| 12,063,486 B2 * | 8/2024 | Soto ................... | H04R 3/005 |
| 2011/0113041 A1 * | 5/2011 | Hawthorne .......... | G06Q 30/02 |
| | | | 707/E17.108 |
| 2011/0154197 A1 * | 6/2011 | Hawthorne .......... | G06F 16/41 |
| | | | 715/704 |
| 2015/0163346 A1 * | 6/2015 | Adams ............... | H04M 3/2236 |
| | | | 379/406.08 |
| 2016/0283860 A1 * | 9/2016 | Pycock ............. | H04N 21/4788 |
| 2021/0209371 A1 * | 7/2021 | Zhang ................ | G10L 25/54 |
| 2023/0308822 A1 * | 9/2023 | Radisavljevic ....... | H04S 7/30 |
| 2024/0195918 A1 * | 6/2024 | Piket ................. | G10L 21/0216 |

* cited by examiner

*Primary Examiner* — Alexander Krzystan
(74) *Attorney, Agent, or Firm* — BakerHostetler

(57) ABSTRACT

This application provides techniques of generating an audio resource pool based on extracting audio from target videos. The techniques comprise obtaining target videos; determining at least one to-be-processed video from the target videos based on audio features of the target videos; extracting audio from the at least one to-be-processed video; and generating an audio resource pool based on the extracted audio.

20 Claims, 10 Drawing Sheets

VIDEO PROCESSING METHOD AND APPARATUS

CROSS-REFERENCE TO RELATED APPLICATION

The present application claims priority to Chinese Patent Application No. 202111566622.7, entitled "VIDEO PROCESSING METHOD AND APPARATUS", filed on Dec. 20, 2021, the disclosure of which is incorporated herein by reference in its entirety.

BACKGROUND

With the rapid development of computer technologies and multimedia technologies, videos carry richer and more expressive information than text and pictures and therefore are concerned and beloved by more users, and various videos emerge. In the conventional technology, a producer can shoot and produce a video and upload the video to a video platform. Users can view the video anytime, anywhere on the video platform.

SUMMARY

In view of this, embodiments of this application provide a video processing method. This application also relates to a video processing apparatus, a computing device, and a computer-readable storage medium, to resolve technical problems that a video cannot be displayed in diversified manners and user experience is poor in the conventional technology.

According to a first aspect of the embodiments of this application, a video processing method is provided and includes:
obtaining target videos;
selecting a to-be-processed video from the target videos based on audio features of the target videos; and
extracting audio from the to-be-processed video, and storing the audio in an audio resource pool.

According to a second aspect of the embodiments of this application, a video processing method is provided and includes:
selecting, in response to an audio play operation of a user, target audio corresponding to the user from an audio resource pool based on historical behavior data of the user and playing the target audio, where the audio resource pool is constructed by using the following method:
obtaining target videos;
selecting a to-be-processed video from the target videos based on audio features of the target videos; and
extracting audio from the to-be-processed video, and storing the audio in the audio resource pool.

According to a third aspect of the embodiments of this application, a video processing apparatus is provided and includes:
an obtaining module, configured to obtain target videos;
a selection module, configured to select a to-be-processed video from the target videos based on audio features of the target videos; and
an extraction module, configured to extract audio from the to-be-processed video, and store the audio in an audio resource pool.

According to a fourth aspect of the embodiments of this application, a video processing apparatus is provided and includes:
a playing module, configured to select, in response to an audio play operation of a user, target audio corresponding to the user from an audio resource pool based on historical behavior data of the user and play the target audio, where the audio resource pool is constructed by using the following method:
obtaining target videos;
selecting a to-be-processed video from the target videos based on audio features of the target videos; and
extracting audio from the to-be-processed video, and storing the audio in the audio resource pool.

According to a fifth aspect of the embodiments of this application, a computing device is provided and includes:
a memory and a processor, where
the memory is configured to store computer executable instructions, and the processor is configured to execute the computer executable instructions to implement any step of the video processing method.

According to a sixth aspect of the embodiments of this application, a computer-readable storage medium is provided. The computer-readable storage medium stores computer executable instructions, and the computer executable instructions are executed by a processor to implement any step of the video processing method.

In the video processing method provided in this application, the target videos may be first obtained, the to-be-processed video may be selected from the target videos based on the audio features of the target videos, and then the audio in the to-be-processed video may be extracted and stored in the audio resource pool. In this case, the to-be-processed video may be selected from the obtained target videos. The selected to-be-processed video may be a video suitable for being played as audio alone. Then the audio in the to-be-processed video is extracted and stored in the audio resource pool. In this way, the audio in the video can be extracted alone, and an audio play function of the video can be provided alone, so that the audio in the video can be played alone, thereby providing a video listening experience function to the user and making video display more diversified.

DESCRIPTION OF EMBODIMENTS

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of the same type. For example, without departing from the scope of one or more embodiments of this application, "first" may also be referred to as "second", and similarly, "second" may also be referred to as "first". Depending on the context, for example, the word "if" used herein can be explained as "while", "when", or "in response to determining".

This application provides a video processing method. This application also relates to a video processing apparatus, a computing device, and a computer-readable storage medium. The video processing method, the video processing apparatus, the computing device, and the computer-readable storage medium are described in detail in the following embodiments one by one.

Figure 1:
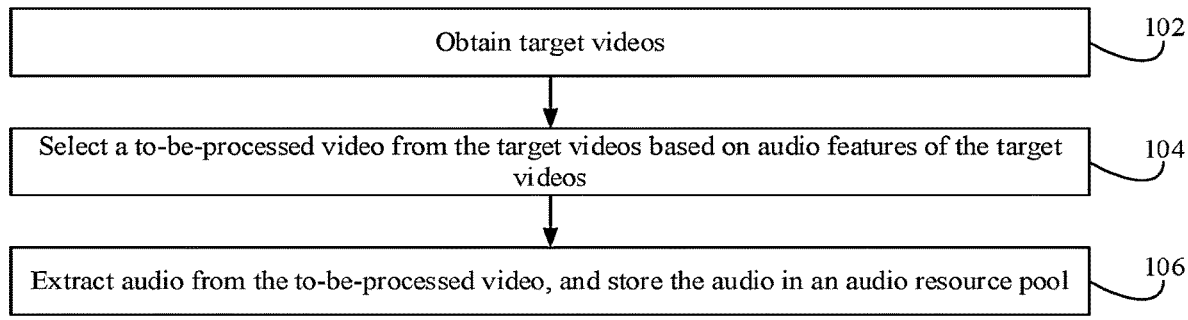
FIG. 1 is a flowchart illustrating a video processing method according to an embodiment of this application.

FIG. 1 is a flowchart illustrating a video processing method according to an embodiment of this application. The method specifically includes the following steps.

Step 102: Obtain target videos.

It should be noted that the target video may be a video released on a video platform, namely, a video that can be viewed by a user on the video platform. At least one target video may be obtained. The video platform may be a platform that can receive a video uploaded by a producer/creator. Both a video and audio can be played on the video platform. However, the existing techniques allow videos uploaded by producers/creators to be viewed by users only by using playback of video images. Consequently, the videos cannot be displayed in diversified manners, causing poor user experience. The techniques described in this disclosure enable users to generate an audio resource pool based on processing videos and play audio (i.e., audio comprised in videos) alone based on the generated audio resource pool.

In an optional implementation of this embodiment, a specific implementation process of obtaining the target videos may be as follows:

obtaining uploaded videos, and using the uploaded videos as the target videos; or obtaining uploaded videos, and selecting target videos that meet a video content rule from the obtained uploaded videos.

It should be noted that uploaded videos uploaded by producers may be directly used as the obtained target videos, and then a to-be-processed video suitable for being played as audio alone may be directly selected from the obtained target videos. Alternatively, after uploaded videos uploaded by producers are obtained, videos that meet the video content rule may be selected as the target videos, and then a to-be-processed video suitable for being played as audio alone may be selected from the selected target videos. Therefore, the target videos are obtained in diversified flexible manners, which can adapt to a plurality of application scenarios.

In actual applications, the video content rule may be a preset rule used to determine whether the video content is compliant, in other words, the video content rule may be a platform rule preset in the video platform, and is used to select a video that meets a compliance requirement. In an example, the video content rule may be that a video uploader is not a user in a blacklist, and video content has a release copyright, and does not include pornography, violence, and other content that violates national laws and regulations.

In this embodiment of this application, the uploaded videos uploaded by the users may include some videos that do not meet the compliance requirement, and these videos are not suitable for release or for being played as audio alone. Therefore, after the uploaded videos uploaded by the producers are obtained, screening may be first performed according to the preset video content rule, to select videos that meet the video content rule as the target videos, so that all to-be-processed videos subsequently selected from the target videos are videos that meet the compliance requirement and can be normally released, and extracted audio does not include prohibited information, thereby ensuring the compliance of the audio extracted from the to-be-processed video.

Step 104: Select a to-be-processed video from the target videos based on audio features of the target videos.

In this embodiment of this application, after the target videos are obtained, the to-be-processed video may be selected from the target videos based on the audio features of the target videos. The audio feature of the target video may be a feature that can indicate whether the target video is suitable for being played as audio alone, for example, whether the target video includes a sound, video duration, or a video type. The to-be-processed video may be a video that is selected based on the audio features of the target videos and is suitable for being played as audio alone.

It should be noted that whether the target video is suitable for being played as audio alone may depend on sound content, a video type, and the like included in the target video, in other words, the audio feature of the target video may include sound content, a video type, and the like of the target video. In actual applications, only a video that includes sound content and has relatively short video duration is suitable for being played as audio alone, and a video that does not include sound content or a video that has excessively long duration is not suitable for being played as audio alone. In addition, some types of videos are suitable for being played as audio alone, for example, singing, storytelling, crosstalk, and episode videos. Some types of videos are not suitable for being played as audio alone, for example, dance videos and painting videos.

In specific implementation, for each target video, it may be determined whether sound content included in the target video is suitable for being played as audio alone, for example, whether there is a sound in the target video and whether video duration of the target video exceeds a duration threshold. Alternatively, it may be determined whether a video type of the target video is a preset video type suitable for being played as audio alone. In this way, the to-be-processed video suitable for being played as audio alone can be selected from the obtained target videos based on sound content and video types of the target videos.

It should be noted that for some of the obtained target videos, it is not suitable to extract and play audio alone. For a target video for which it is not suitable to extract and play audio alone, audio play experience may be relatively poor if the audio is extracted and played alone. Therefore, in this embodiment of this application, to ensure that audio extracted from the target video is suitable for being played as audio alone and good audio listening experience can be brought, the to-be-processed video may be selected from the target videos based on the audio features of the target videos. The selected to-be-processed video is a video suitable for being played as audio alone. Then the audio is extracted from the selected to-be-processed video, and the to-be-processed video is played as audio alone, so that good audio listening experience is ensured.

Step 106: Extract the audio from the to-be-processed video, and store the audio in an audio resource pool.

In this embodiment of this application, after the to-be-processed video is selected from the target videos based on the audio features of the target videos, the audio in the to-be-processed video may be extracted and stored in the audio resource pool. The audio resource pool may be storage space for storing each piece of audio extracted from to-be-processed videos.

In actual applications, a video file of the to-be-processed video may be obtained, and the video file may be parsed to obtain audio track data in the video file. The obtained audio track data is the audio extracted from the to-be-processed video. The audio is stored in the audio resource pool after being extracted.

In a possible implementation, when the audio is stored in the audio resource pool, each piece of audio may further carry a video identifier. The video identifier of each piece of audio may be used to indicate a video corresponding to the audio, in other words, the video identifier is used to indicate the video from which the audio is extracted. Subsequently, audio corresponding to a specific video may be searched for based on the video identifier and played.

In another possible implementation, when the audio is stored in the audio resource pool, a corresponding audio label may be further set for each piece of audio. The audio label may be a type label of the audio. In specific implementation, after the audio in the to-be-processed video is extracted, a video type of the to-be-processed video may be used as an audio label of the extracted audio, so that audio a user likes can be subsequently recommended to the user based on the audio label carried in the audio.

In still another possible implementation, when the audio is stored in the audio resource pool, a recommendation label may be further set for some audio, and the recommendation label may be used to indicate that corresponding audio is popular content and is preferentially recommended. In specific implementation, after the audio in the to-be-processed video is extracted, if the to-be-processed video is current popular content, a recommendation label may be set for the audio extracted from the to-be-processed video, and the audio may be subsequently preferentially recommended. Alternatively, after the audio is stored in the audio resource pool, an audio label of each piece of audio stored in the audio resource pool may be obtained, audio corresponding to current popular current may be determined based on the audio label, and a recommendation label may be set for the determined audio.

It should be noted that a personalized recommendation system may be constructed by setting the video identifier, the audio label, the recommendation label, and the like for the audio in the audio resource pool, so that after an audio recommendation mode is entered, personalized audio is recommended to the user and played, thereby improving user experience.

Figure 2:
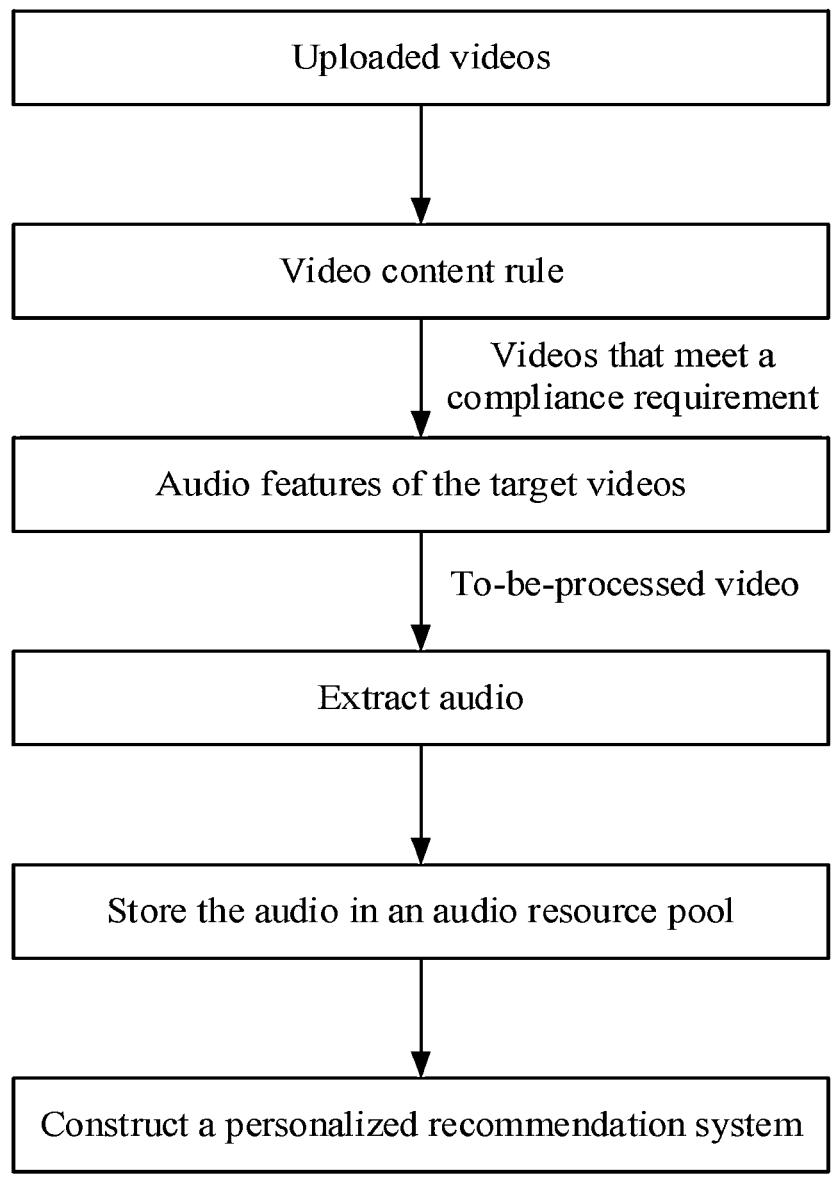
FIG. 2 is a schematic diagram illustrating a video processing process according to an embodiment of this application.

For example, FIG. 2 is a schematic diagram illustrating a video processing process according to an embodiment of this application. As shown in FIG. 2, after uploaded videos are obtained, screening is first performed on the uploaded videos according to a video content rule, to obtain videos that meet a compliance requirement. Then a to-be-processed video suitable for being played as audio alone is selected from obtained target videos that meet the compliance requirement based on audio features of the target videos. Then audio is extracted from the to-be-processed video and stored in an audio resource pool. A personalized recommendation system may be constructed by setting a video identifier, an audio label, a recommendation label, and the like for audio in the audio resource pool, so that personalized audio can be recommended to the user and played.

In this embodiment of this application, the audio in the to-be-processed video may be extracted and stored in the audio resource pool. The audio resource pool stores the audio extracted from the video. Subsequently, the audio in the audio resource pool may be played alone, and an audio play function of the video is provided alone, so that the audio in the video can be played alone, thereby providing a video listening experience function to the user, making video display more diversified, and improving user experience.

In an optional implementation of this embodiment, after the target video is processed to construct the audio resource pool, a play function may be further provided to the user. In other words, after the audio in the to-be-processed video is extracted and stored in the audio resource pool, the method may further include:

selecting, in response to an audio play operation of the user, target audio corresponding to the user from the audio resource pool based on historical behavior data of the user and playing the target audio.

It should be noted that the audio play operation may be a preset operation used to trigger audio play. The historical behavior data may be related data of behaviors of video viewing, audio play, liking, reposting, and the like of the user before the current time. The historical behavior data can reflect preferences of the user, in other words, reflect a type of audio and video the user prefers to view or play.

In an optional implementation of this embodiment, an audio recommendation interface may be displayed in response to the audio play operation of the user, to play the selected target audio. That is, a specific implementation process of selecting, in response to the audio play operation of the user, the target audio corresponding to the user from the audio resource pool based on the historical behavior data of the user and playing the target audio may be as follows:

displaying the audio recommendation interface; and playing the target audio on the audio recommendation interface, and displaying parameter information of the target audio.

Specifically, the audio recommendation interface may be an interface displayed on a video platform of a terminal when the audio in the audio resource pool is played. The parameter information of the target audio may be information related to the played target audio. For example, the parameter information may include a cover picture, an audio title, an audio overview, producer information (a profile picture, a nickname, and the like), and a release time. In addition, a producer follow control may be further set, so that the user can quickly and conveniently follow a producer of a video corresponding to the audio. In actual implementation, the parameter information may be obtained when the audio is extracted, and then carried in the audio and stored in the audio resource pool.

It should be noted that if it is detected that the user triggers the audio play operation, it indicates that the user wants to listen to audio alone. In this case, the audio recommendation mode may be entered on the video platform, in other words, a jump to the audio recommendation interface may be implemented, and the audio recommendation interface is displayed. The target audio is played on the displayed audio recommendation interface, and the parameter information of the target audio is displayed. The user can learn of related information of the currently played target audio by using the parameter information displayed on the audio recommendation interface.

In addition to displaying the parameter information of the target audio on the audio recommendation interface, a play controlling control may be disposed on the audio recommendation interface, so that the user can control audio play. For example, the play controlling control may be a control such as a progress bar, "play/pause", "previous", "next", or "display the playlist". In addition, an interaction control may be further disposed on the audio recommendation interface, and the interaction control is used by the user to perform an interactive operation in a process of listening to the target audio. For example, the interaction control may be "like", "reward", "favorite", "comment", or "share."

Figure 3:
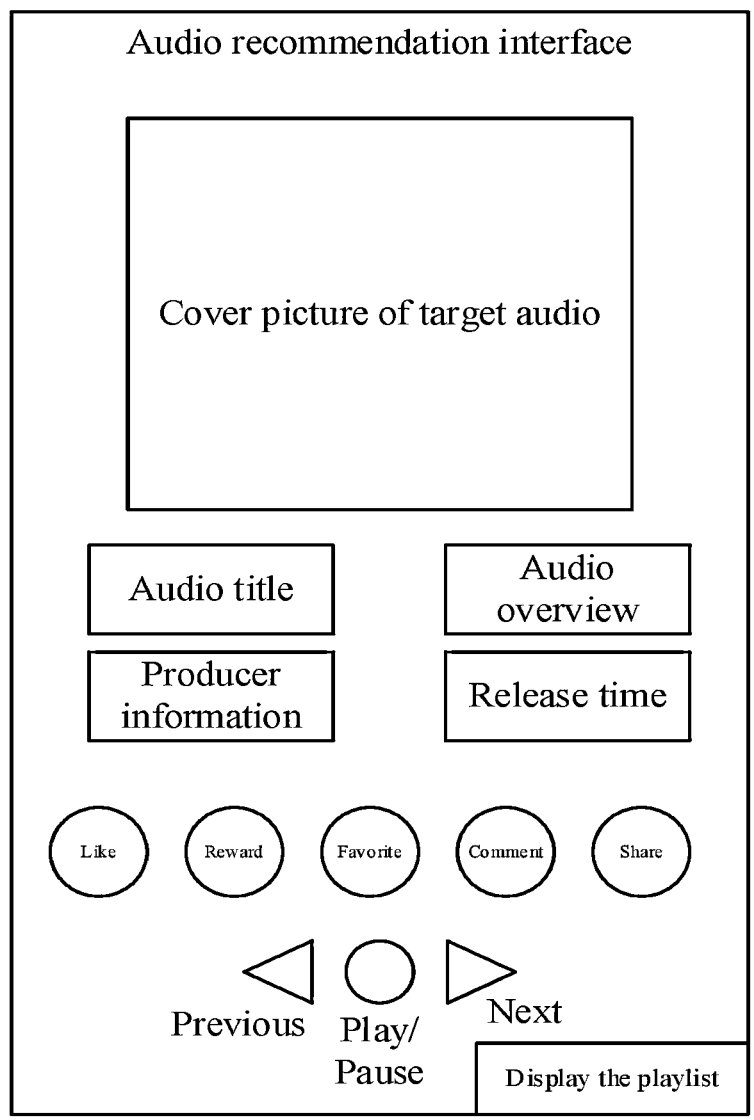
FIG. 3 is a schematic diagram illustrating an audio recommendation interface according to an embodiment of this application.

For example, FIG. 3 is a schematic diagram illustrating an audio recommendation interface according to an embodiment of this application. As shown in FIG. 3, a cover picture, an audio title, an audio overview, producer information, and a release time of currently played target audio are displayed on the audio recommendation interface. Controls such as "play/pause", "previous", "next", "display the playlist", "like", "reward", "favorite", "comment", and "share" are further disposed on the audio recommendation interface.

In actual applications, when the audio recommendation interface is displayed on the video platform of the terminal (in other words, in the foreground), audio may be continuously obtained from the audio resource pool and played. In addition, when the audio recommendation interface is in the background, for example, when the screen is off or another picture interface is displayed, audio may be continuously obtained from the audio resource pool and continuously played in the background until the audio recommendation mode is exited (it is detected that the video platform is disabled, or it is detected that an exit control on the audio recommendation interface is triggered). In other words, after the audio recommendation mode is entered, audio in the audio resource pool may be indefinitely continuously played in the foreground or the background.

In this embodiment of this application, if it is detected that the user triggers the audio play operation, it indicates that the user wants to listen to audio alone. Therefore, the audio recommendation interface may be displayed on the video platform, to display related information of the currently played target audio, and provide a control function of the currently played video and an interaction function on the audio recommendation interface, so that the user can freely control the played audio, and perform corresponding interaction, thereby improving user experience.

In an optional implementation of this embodiment, different slide operations are performed on the audio recommendation interface to implement different functions. In other words, after the target audio is played on the audio recommendation interface, the method may further include:

when a slide operation in a first preset direction on the audio recommendation interface is detected, performing switching to play another piece of audio in the audio resource pool;

when a slide operation in a second preset direction on the audio recommendation interface is detected, switching the audio recommendation interface to an audio content interface, where the audio content interface includes an audio list of a target topic; and when a slide operation in a third preset direction on the audio recommendation interface is detected, switching the audio recommendation interface to a favorite interface, where the favorite interface includes a favorite video of the user.

It should be noted that the first preset direction, the second preset direction, and the third preset direction may be different preset slide directions, and are used to implement different control functions. In specific implementation, the first preset direction may be a preset direction used to control played audio to be switched. For example, the first preset direction may be an upward/downward direction, the previous audio is played when sliding is performed upward, and the next audio is played when sliding is performed downward. The second preset direction may be a preset direction used to control switching to the audio content interface. For example, the second preset direction may be a leftward direction, and sliding may be performed leftward to switch the audio recommendation interface to the audio content interface. The third preset direction may be a preset direction used to control switching to the favorite interface. For example, the third preset direction may be a rightward direction, and sliding may be performed rightward to switch the audio recommendation interface to the favorite interface.

In actual applications, if a recommended play mode is currently entered, when sliding is performed upward/downward to switch to the previous audio/the next audio, audio may be randomly obtained from the audio resource pool and played. If a list play mode is currently entered, when sliding is performed upward/downward to switch to the previous audio/the next audio, audio may be obtained from the audio resource pool and played based on a play sequence in a list.

In addition, the audio content interface includes the audio list of the target topic. The staff may classify, based on current specific popular topics, audio labels, recommendation labels, and the like of the audio in the audio resource pool, some audio included in the current resource pool to obtain a corresponding audio list. Audio included in the audio list is audio recommended under a specific topic, so that the user can subsequently directly select an audio list of interest for play on the audio content interface.

In addition to the recommended audio under the specific topic, the audio list may include an overview to the audio list and a recommendation reason for each piece of audio. The recommendation reason may be edited by the staff and carried in corresponding audio in the audio resource pool.

Figure 4:
FIG. 4 is a schematic diagram illustrating an audio content interface according to an embodiment of this application.

For example, FIG. 4 is a schematic diagram illustrating an audio content interface according to an embodiment of this application. As shown in FIG. 4, the audio content interface includes a nostalgic song list and a popular episode list, the nostalgic song list includes a list overview, song audio 1, song audio 2, song audio 3, and recommendation reasons corresponding to the song audio 1, the song audio 2, and the song audio 3, and the popular episode list includes a list overview, episode audio 1, episode audio 2, and recommendation reasons corresponding to the episode audio 1 and the episode audio 2.

In addition, the favorite interface includes the favorite video of the user. The user may add some videos of interest to favorites on the video platform. When a slide operation in the third preset direction on the audio recommendation interface is detected, the audio recommendation interface may be switched to the favorite interface, and the video the user adds to favorites may be displayed on the favorite interface, so that subsequently, audio corresponding to the favorite video can be directly played.

Figure 5:
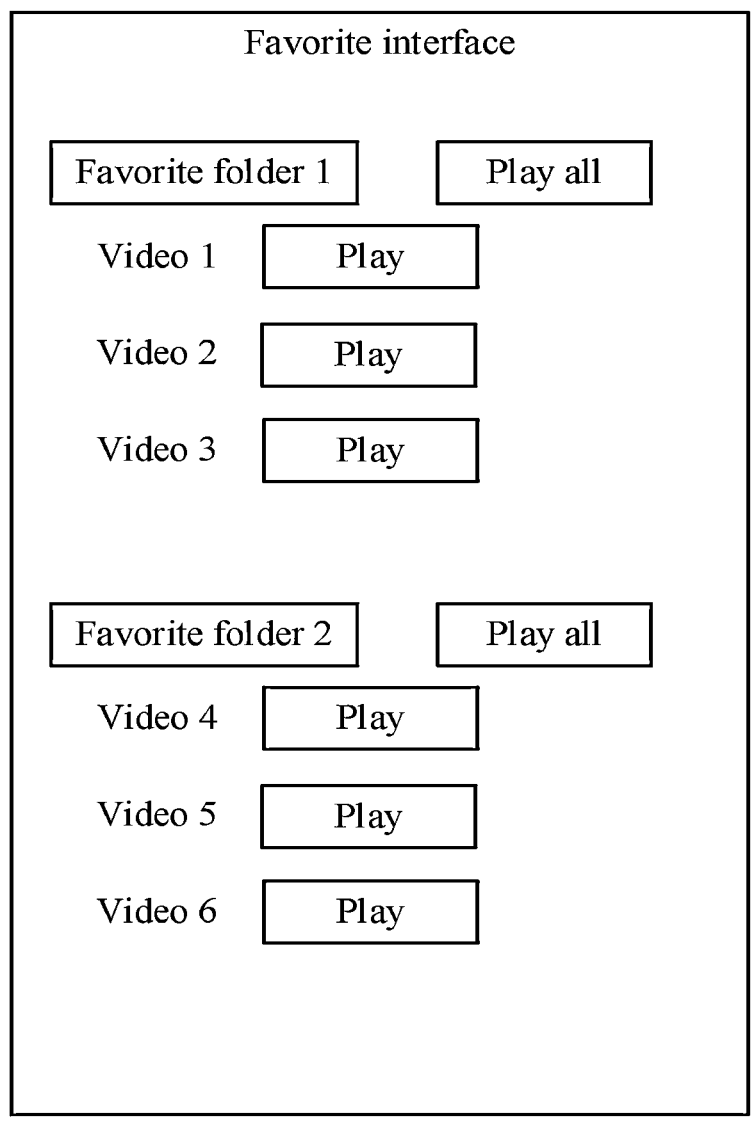
FIG. 5 is a schematic diagram illustrating a favorite interface according to an embodiment of this application.

For example, FIG. 5 is a schematic diagram illustrating a favorite interface according to an embodiment of this application. As shown in FIG. 5, the favorite interface includes two favorite folders, a favorite folder 1 includes a video 1, a video 2, and a video 3, and a favorite folder 2 includes a video 4, a video 5, and a video 6.

In this embodiment of this application, different slide operations are performed on the audio recommendation interface to implement different functions, so that sliding control experience is provided to the user, which can implement accurate play control of audio content while providing entertainment.

In an optional implementation of this embodiment, an audio list of interest may be directly played by using the audio content interface. In other words, after the audio recommendation interface is switched to the audio content interface, the method may further include:

when a first play request is detected on the audio content interface, determining a target audio list corresponding to the first play request; and sequentially obtaining audio included in the target audio list from the audio resource pool and playing the audio.

It should be noted that each audio list included in the audio content interface corresponds to a play control. The first play request may be detected when the play control is triggered. An audio list corresponding to the play control is an audio list the user wants to play, namely, the target audio list. In this case, the list play mode is entered, and the audio included in the target audio list is sequentially obtained from the audio resource pool and played. In this way, audio lists of different topics can be recommended to the user by using the audio content interface, and the user can directly select the audio list of interest. In this case, the audio in the audio list can be sequentially played, and the list play mode can be entered by using the audio content interface. This is simple and convenient, and user experience is improved.

Continuing with the foregoing example, as shown in FIG. 4, corresponding play controls are disposed for both the nostalgic song list and the popular episode list. Assuming that the user clicks a play control corresponding to the nostalgic song list, the nostalgic song list is the target audio list, and the audio included in the nostalgic song list is sequentially obtained from the audio resource pool and played.

In an optional implementation of this embodiment, audio corresponding to the favorite video may be directly played by using the favorite interface. In other words, after the audio recommendation interface is switched to the favorite interface, the method may further include:

when a second play request is detected on the favorite interface, determining a target favorite video corresponding to the second play request; and obtaining audio corresponding to the target favorite video from the audio resource pool and playing the audio.

It should be noted that each favorite video included in the favorite interface corresponds to a play control, and each favorite folder also corresponds to a play control. In other words, the user may choose to play audio corresponding to a favorite video, or may choose to play audio corresponding to all favorite videos in a favorite folder. The second play request may be detected when a play control is triggered. A favorite video corresponding to the triggered play control is a video the user wants to play, namely, the target favorite video. In this case, audio corresponding to the target favorite video may be obtained from the audio resource pool and played. There may be one target favorite video, or all favorite videos in a favorite folder may be target favorite videos.

In actual applications, if the play control triggered by the user is a play control corresponding to a favorite folder, the list play mode may be entered, and audio corresponding to all favorite videos in the favorite folder is sequentially obtained from the audio resource pool and played. In this way, the user can directly play, by using the favorite interface, audio corresponding to a video previously added to favorites, which is simple and convenient, and can meet a management requirement of specific videos and an audio play requirement of the user, so that user experience is improved.

Continuing with the foregoing example, as shown in FIG. 5, all of the video 1 to the video 6 include corresponding play controls, and the favorite folder 1, the favorite folder 2, and a favorite folder 3 also include corresponding "play all" controls. Assuming that the user clicks a "play all" control corresponding to the favorite folder 1, audio corresponding to the video 1, the video 2, and the video 3 may be sequentially obtained from the audio resource pool and played.

Figure 6:
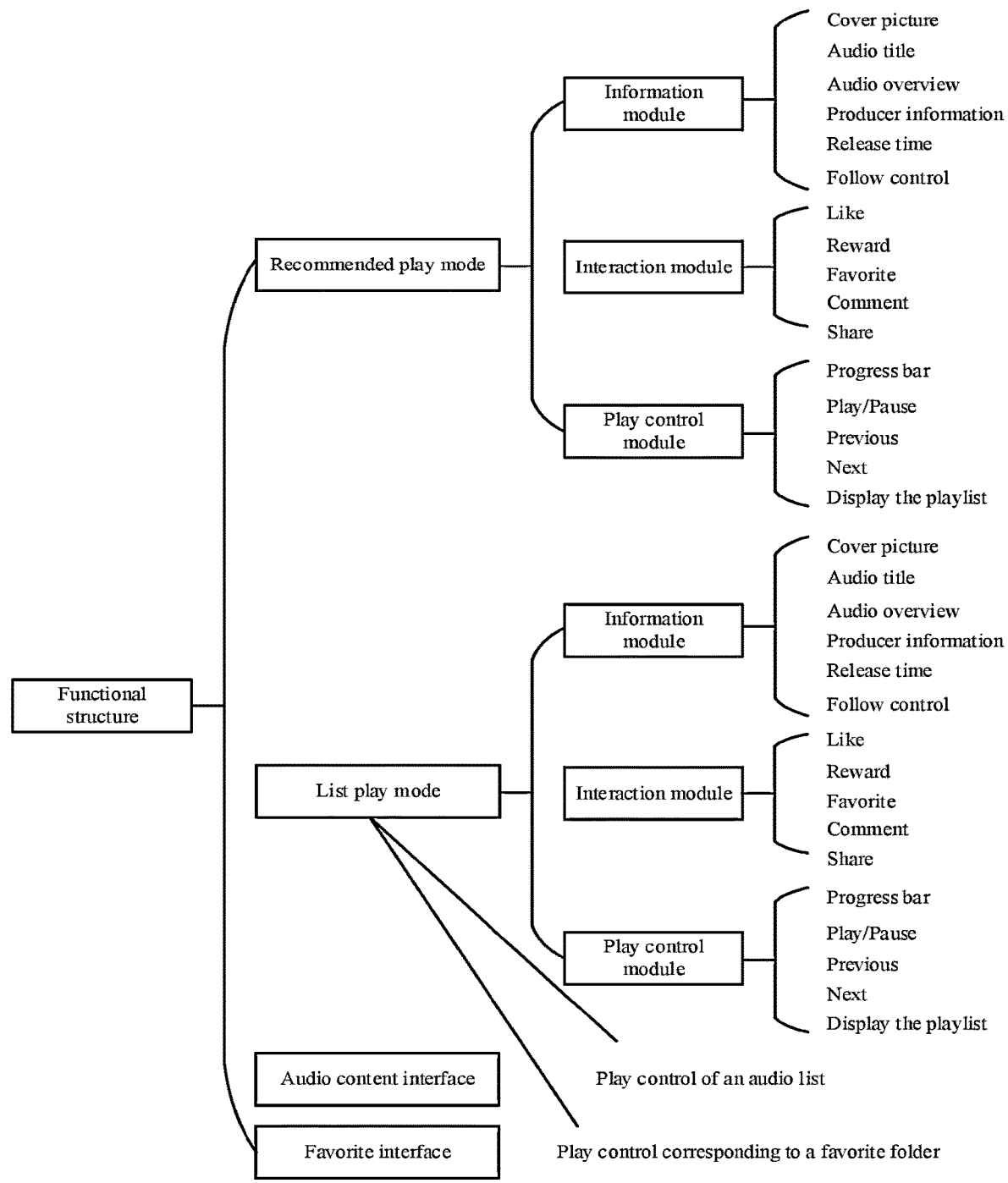
FIG. 6 is a schematic diagram illustrating a functional structure of audio play according to an embodiment of this application.

For example, FIG. 6 is a schematic diagram illustrating a functional structure of audio play according to an embodiment of this application. As shown in FIG. 6, the functional structure includes a recommended play mode, a list play mode, an audio content interface, and a favorite interface. The recommended play mode and the list play mode each include an information module, an interaction module, and a play control module. The information module includes a cover picture, an audio title, an audio overview, producer information, a release time, and a follow control, the interaction module includes "like", "reward", "favorite", "comment", and "share", and the play control module includes a progress bar, "play/pause", "previous", "next", and "display the playlist".

In addition, the list play mode can be entered by triggering a play control of an audio list on the audio content interface or a play control corresponding to a favorite folder on the favorite interface, to play audio in a selected list. The recommended play mode is entered if the user does not select any list or playing of the selected list is completed. In the recommended play mode, audio related to the preferences of the user may be randomly obtained from the audio resource pool for recommended play. A corresponding "display the playlist" control in the recommended play mode may display audio determined from the audio resource pool and recommended to the user.

In an optional implementation of this embodiment, the user may trigger the audio play operation by using a setting interface of the video platform. That is, a specific implementation process of selecting, in response to the audio play operation of the user, the target audio corresponding to the user from the audio resource pool based on the historical behavior data of the user and playing the target audio may be as follows:

when it is detected that an audio control included in the setting interface is triggered, determining that the audio play operation is detected, and selecting the target audio corresponding to the user from the audio resource pool based on the historical behavior data of the user and playing the target audio.

It should be noted that the setting interface may be an interface for displaying user information and setting some functions or information on the video platform, for example, a "My" interface of the video platform. In specific implementation, an audio control may be added to the setting interface of the video platform. If the user triggers the audio control, it is determined that the audio play operation is detected. In this case, the audio recommendation mode may be entered, a jump may be implemented to display the audio recommendation interface, the preferred target audio of the user may be selected from the audio resource pool based on the historical behavior data of the user and played, and play control may be performed by using the audio recommendation interface. In this way, the audio recommendation mode can be entered by using the setting interface of the video platform. The operation process is simple and convenient, to make operations of the user easier and improve user experience.

In an optional implementation of this embodiment, when the audio play operation is triggered by using the setting interface of the video platform, audio matching the preferences of the user may be selected as the target audio based on a label of each piece of audio in the audio resource pool and the historical behavior data of the user and played. That is, each piece of audio in the audio resource pool carries an audio label, and in this case, a specific implementation process of selecting the target audio corresponding to the user from the audio resource pool based on the historical behavior data of the user and playing the target audio may be as follows:

determining a preferred audio type corresponding to the historical behavior data of the user; and selecting the target audio corresponding to the user from the audio resource pool based on the preferred audio type and the audio label of each piece of audio in the audio resource pool and playing the target audio.

It should be noted that the audio label may be a label used to indicate an audio type. In actual applications, when the audio play operation triggered by the user is detected, the preferred audio type corresponding to the user may be determined based on the historical behavior data of the user, and then the audio corresponding to the preferred audio type is selected based on the audio label of each piece of audio in the audio resource pool. If a plurality of pieces of audio are selected, any one of the plurality of pieces of audio may be used as the target audio and played.

In this embodiment of this application, when the audio play operation is triggered by using the setting interface of the video platform, the user does not select any audio, and audio is directly selected from the audio resource pool and played. In this case, the target audio related to the preferences of the user may be determined based on the historical behavior data of the user, and the target audio may be played for the user, so that effects of personalized recommendation are achieved, and user experience is improved.

In an optional implementation of this embodiment, the user may trigger the audio play operation by using a play interface. That is, a specific implementation process of selecting, in response to the audio play operation of the user, the target audio corresponding to the user from the audio resource pool based on the historical behavior data of the user and playing the target audio may be as follows:

when it is detected that an audio control included in the video play interface of the to-be-processed video is triggered, determining that the audio play operation is detected; and selecting the audio corresponding to the to-be-processed video from the audio resource pool, and using the audio corresponding to the to-be-processed video as the target audio corresponding to the user and playing the audio.

In actual applications, the to-be-processed video is a video for extracting audio, in other words, the to-be-processed video has corresponding audio in the audio resource pool. Therefore, the audio control may be displayed on the video play interface of the to-be-processed video. The user may trigger the audio control on the play interface in the process of playing the to-be-processed video. In this case, it may be determined that the audio play operation is detected, and the play interface of the to-be-processed video may jump to the audio recommendation interface.

It should be noted that, because the user triggers the audio play operation by using the play interface of the to-be-processed video, to enter the audio recommendation mode, it indicates that the user may want to continue listening to the audio corresponding to the to-be-processed video. Therefore, when a jump to the audio recommendation interface is implemented, the audio corresponding to the to-be-processed video is selected from the audio resource pool, and the audio corresponding to the to-be-processed video is used as the target audio corresponding to the user and played.

In this embodiment of this application, when the audio play operation is triggered by using the play interface of the to-be-processed video, the audio corresponding to the to-be-processed video may be directly played for the user. In other words, the video play interface may directly jump to the audio recommendation interface to play the audio. In addition to providing video viewing experience to the user, corresponding audio listening experience may be provided to the user, so that video display is more diversified, and user experience is improved.

In an optional implementation of this embodiment, the audio recommendation mode may be automatically entered when playing of a current video is completed. In other words, the video processing method may further include: automatically entering the audio recommendation mode when it is detected that playing of the current video is completed; and selecting the target audio from the audio resource pool and playing the target audio.

In actual applications, when it is detected that playing of the current video is completed, the audio recommendation mode may be automatically entered, a jump to the audio recommendation interface may be automatically implemented, the target audio may be selected from the audio resource pool and played, and play control may be performed by using the audio recommendation interface. In this way, a jump to the audio recommendation mode may be automatically implemented after playing of the current video is completed. The operation process is simple and convenient, to make operations of the user easier and improve user experience.

It should be noted that when a jump to the audio recommendation interface is automatically implemented to play audio after playing of the current video is completed, the user does not select any audio, and the audio recommendation mode is directly entered. In this case, the target audio related to the preferences of the user may also be determined based on the historical behavior data of the user, and the audio is played for the user, so that effects of personalized recommendation are achieved, and user experience is improved.

A specific implementation process of selecting the target audio from the audio resource pool and playing the target audio is similar to the foregoing specific implementation process of selecting the target audio from the audio resource pool and playing the target audio when the audio play operation is triggered by using the setting interface of the video platform. Details are omitted herein for simplicity in this application.

In this embodiment of this application, the audio play operation may be triggered by using the setting interface of the video platform, to enter the audio recommendation mode; or the audio play operation may be triggered by using the video play interface, to enter the audio recommendation mode; or the audio recommendation mode may be automatically entered when playing of the current video is completed. Therefore, a plurality of entrances to the audio recommendation mode are provided, and the audio recommendation mode can be entered in diversified flexible manners, which can adapt to a plurality of different application scenarios, so that user experience is improved.

In an optional implementation of this embodiment, another piece of audio may be automatically recommended and played after playing of the target audio is completed. In other words, after the target audio is selected from the audio resource pool and played, the method may further include:

when playing of the target audio is completed, selecting recommended audio associated with the target audio from the audio resource pool and playing the recommended audio.

It should be noted that after the audio recommendation mode is entered through different entrances, the target audio is selected from the audio resource pool and played, and after playing of the target audio is completed, the recommended audio associated with the target audio may be selected from the audio resource pool and continue to be played, to ensure continuity of audio play.

In actual applications, the played target audio is preferred audio of the user or audio corresponding to a video viewed by the user. Therefore, the recommended audio associated with the target audio is actually audio related to the preferences of the user. In specific implementation, the recommended audio may be selected from the audio resource pool based on the historical behavior data of the user.

In a possible implementation, the audio play operation is triggered by using the setting interface of the video platform to play audio, or audio is automatically played when playing of the current video is completed. In both cases, the preferred audio type of the user may be determined based on the historical behavior data of the user, the audio corresponding to the preferred audio type may be selected based on the audio label of each piece of audio in the audio resource pool, any piece of selected audio may be used as the target audio and played, when playing of the current target audio is completed, any piece of the other selected audio may be further selected as the recommended audio and played, and so on.

In another possible implementation, when the audio play operation is triggered by using the play interface to play audio, the currently played target audio is audio corresponding to the played to-be-processed video. Therefore, when playing of the target audio is completed, the preferred audio type of the user may be determined based on the historical behavior data of the user, the audio corresponding to the preferred audio type may be selected based on the audio label of each piece of audio in the audio resource pool, any piece of selected audio may be used as the recommended audio and continue to be played, and then any piece of the other selected audio may be further selected as the recommended audio and played.

In still another possible implementation, if the user selects a list on the audio content interface or the favorite interface, audio included in the list may be sequentially played. After playing of the audio in the list is completed, recommended audio corresponding to the preferences of the user is determined based on the historical behavior data of the user and continues to be played.

In this embodiment of this application, when playing of the target audio is completed, the recommended audio associated with the target audio may be selected from the audio resource pool, in other words, audio corresponding to the preferences of the user is selected and continues to be played, or audio matching the preferences of the user may be recommended to the user based on the preferences of the user. Behavior preferences and content preferences are deduced from historical behavior habits of the user, and personalized content recommendation is performed, to finally achieve effects of personalized recommendation. In addition, audio in the audio resource pool may be continuously played in the foreground or the background, to provide continuous, immersive, and pure listening experience to the user.

In addition, the audio played for the user comes from the audio resource pool, and audio included in the audio resource pool is extracted from a plurality of to-be-processed videos. The plurality of to-be-processed videos may include different types of videos, or may include a plurality of videos of the same type. In other words, the audio included in the audio resource pool may come from videos of different video types or a plurality of videos of the same video type, which ensures that a plurality of content types are provided while ensuring high content verticality, so that user requirements for content diversity and depth are met.

In the video processing method provided in this application, the to-be-processed video may be selected from the obtained target videos. The selected to-be-processed video may be a video suitable for being played as audio alone. Then the audio in the to-be-processed video may be extracted and stored in the audio resource pool, and in response to the audio play operation of the user, the target audio in the audio resource pool may be selected based on the historical behavior data of the user and played. In this way, the audio in the video can be extracted alone, and an audio play function of the video can be provided alone, so that the audio in the video can be played alone, thereby providing a video listening experience function to the user, making video display more diversified, and improving user experience.

Figure 7:
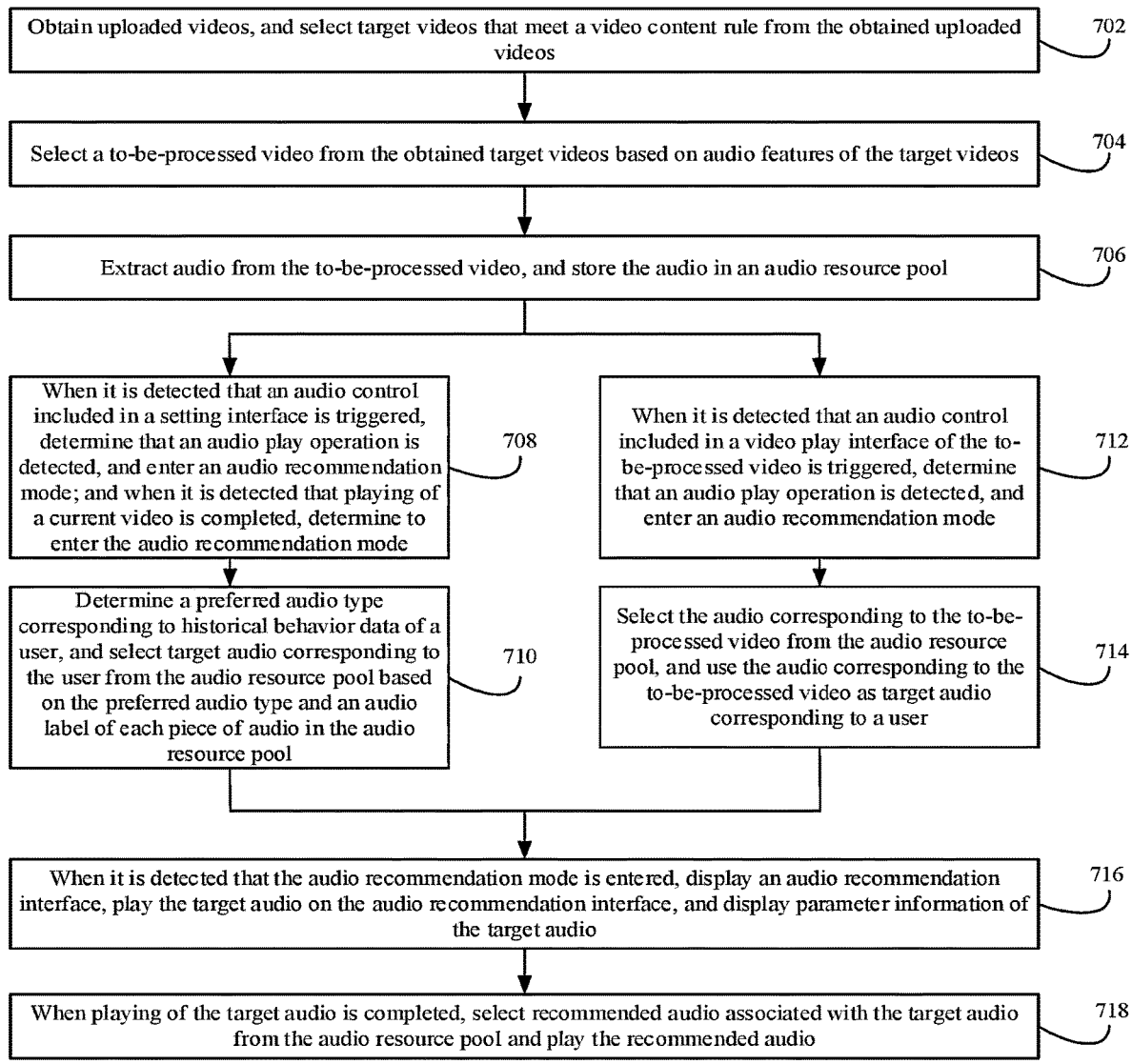
FIG. 7 is a flowchart illustrating another video processing method according to an embodiment of this application.

FIG. 7 is a flowchart illustrating another video processing method according to an embodiment of this application. The method specifically includes the following steps.

Step 702: Obtain uploaded videos, and select target videos that meet a video content rule from the obtained uploaded videos.

Step 704: Select a to-be-processed video from the obtained target videos based on audio features of the target videos.

Step 706: Extract audio from the to-be-processed video, and store the audio in an audio resource pool.

Step 708: When it is detected that an audio control included in a setting interface is triggered, determine that an audio play operation is detected, and enter an audio recommendation mode; and when it is detected that playing of a current video is completed, determine to enter the audio recommendation mode.

Step 710: Determine a preferred audio type corresponding to historical behavior data of a user, and select target audio corresponding to the user from the audio resource pool based on the preferred audio type and an audio label of each piece of audio in the audio resource pool.

Step 712: When it is detected that an audio control included in a video play interface of the to-be-processed video is triggered, determine that an audio play operation is detected, and enter an audio recommendation mode.

Step 714: Select the audio corresponding to the to-be-processed video from the audio resource pool, and use the audio corresponding to the to-be-processed video as target audio corresponding to a user.

Step 716: When it is detected that the audio recommendation mode is entered, display an audio recommendation interface, play the target audio on the audio recommendation interface, and display parameter information of the target audio.

In an optional implementation of this embodiment, different slide operations are performed on the audio recommendation interface to implement different functions. In other words, after the target audio is played on the audio recommendation interface, the method may further include:

when a slide operation in a first preset direction on the audio recommendation interface is detected, performing switching to play another piece of audio in the audio resource pool;

when a slide operation in a second preset direction on the audio recommendation interface is detected, switching the audio recommendation interface to an audio content interface, where the audio content interface includes an audio list of a target topic; and when a slide operation in a third preset direction on the audio recommendation interface is detected, switching the audio recommendation interface to a favorite interface, where the favorite interface includes a favorite video of the user.

In an optional implementation of this embodiment, an audio list of interest may be directly played by using the audio content interface. In other words, after the audio recommendation interface is switched to the audio content interface, the method may further include:

when a first play request is detected on the audio content interface, determining a target audio list corresponding to the first play request; and sequentially obtaining audio included in the target audio list from the audio resource pool and playing the audio.

In an optional implementation of this embodiment, audio corresponding to the favorite video may be directly played by using the favorite interface. In other words, after the audio recommendation interface is switched to the favorite interface, the method may further include:

when a second play request is detected on the favorite interface, determining a target favorite video corresponding to the second play request; and obtaining audio corresponding to the target favorite video from the audio resource pool and playing the audio.

Step 718: When playing of the target audio is completed, select recommended audio associated with the target audio from the audio resource pool and play the recommended audio.

In the video processing method provided in this application, the to-be-processed video may be selected from the obtained target videos. The selected to-be-processed video may be a video suitable for being played as audio alone. Then the audio in the to-be-processed video may be extracted and stored in the audio resource pool, and in response to the audio play operation of the user, the target audio in the audio resource pool may be selected based on the historical behavior data of the user and played. In this way, the audio in the video can be extracted alone, and an audio play function of the video can be provided alone, so that the audio in the video can be played alone, thereby providing a video listening experience function to the user, making video display more diversified, and improving user experience.

An embodiment of this application provides still another video processing method. The method specifically includes the following step:

selecting, in response to an audio play operation of a user, target audio corresponding to the user from an audio resource pool based on historical behavior data of the user and playing the target audio.

The audio resource pool is constructed by using the following method: obtaining target videos; selecting a to-be-processed video from the target videos based on audio features of the target videos; and extracting audio from the to-be-processed video, and storing the audio in the audio resource pool.

Figure 8:
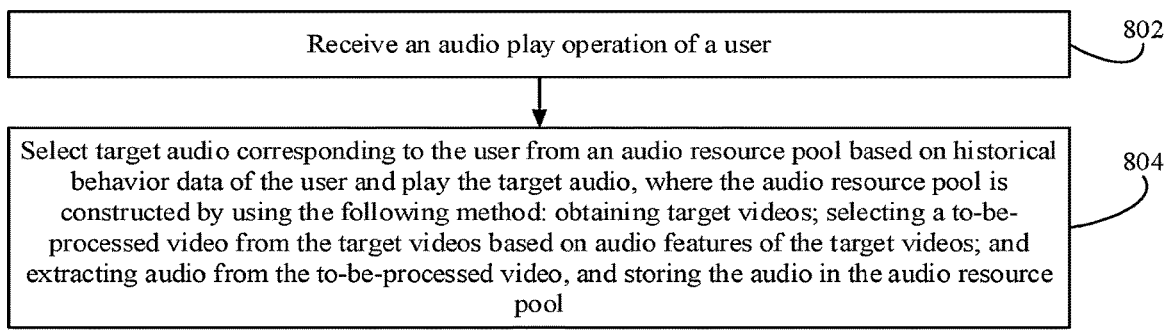
FIG. 8 is a flowchart illustrating still another video processing method according to an embodiment of this application.

It should be noted that for the step of selecting, in response to an audio play operation of a user, target audio corresponding to the user from an audio resource pool based on historical behavior data of the user and playing the target audio, the user needs to trigger the audio play operation, in other words, the target audio is played after the audio play operation of the user is detected. FIG. 8 is a flowchart illustrating still another video processing method according to an embodiment of this application. The method specifically includes the following steps.

Step 802: Receive an audio play operation of a user.

Step 804: Select target audio corresponding to the user from an audio resource pool based on historical behavior data of the user and play the target audio, where the audio resource pool is constructed by using the following method: obtaining target videos; selecting a to-be-processed video from the target videos based on audio features of the target videos; and extracting audio from the to-be-processed video, and storing the audio in the audio resource pool.

In the video processing method provided in this application, the to-be-processed video may be selected from the obtained target videos. The selected to-be-processed video may be a video suitable for being played as audio alone. Then the audio in the to-be-processed video may be extracted and stored in the audio resource pool. In this way, the audio in the video can be extracted alone, and an audio play function of the video can be provided alone, so that the audio in the video can be played alone, thereby providing a video listening experience function to the user and making video display more diversified.

Figure 9:
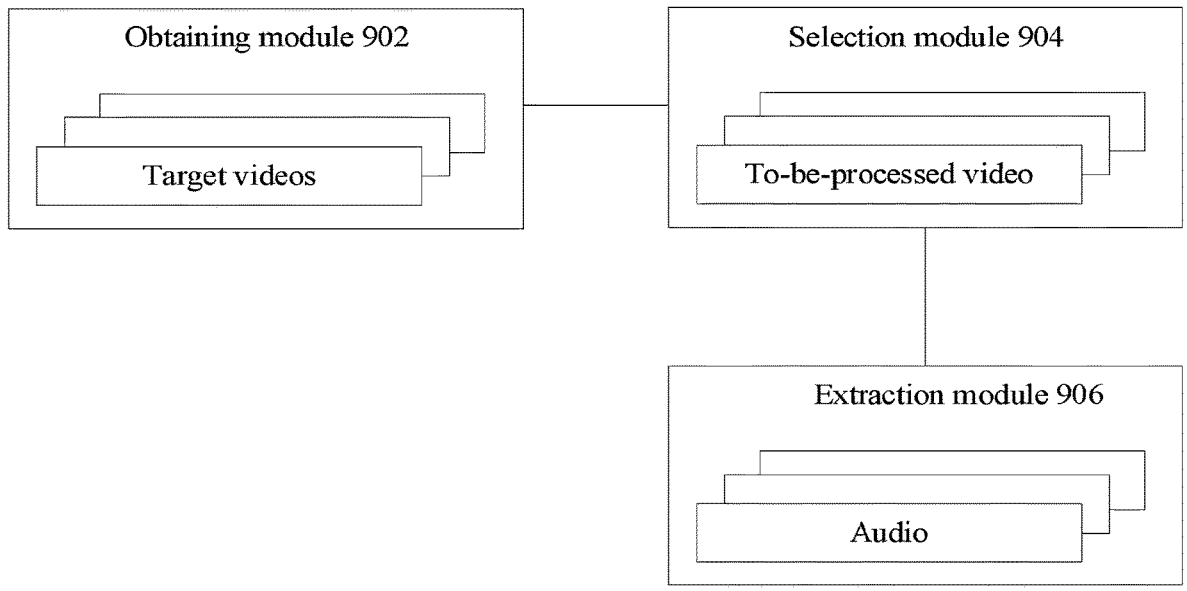
FIG. 9 is a schematic diagram illustrating a structure of a video processing apparatus according to an embodiment of this application.

Corresponding to the method embodiments, this application further provides embodiments of a video processing apparatus. FIG. 9 is a schematic diagram illustrating a structure of a video processing apparatus according to an embodiment of this application. As shown in FIG. 9, the apparatus includes:

an obtaining module 902, configured to obtain target videos;

a selection module 904, configured to select a to-be-processed video from the target videos based on audio features of the target videos; and an extraction module 906, configured to extract audio from the to-be-processed video, and store the audio in an audio resource pool.

Optionally, the obtaining module 902 is further configured to:

obtain uploaded videos, and use the uploaded videos as the target videos; or obtain uploaded videos, and select target videos that meet a video content rule from the obtained uploaded videos.

Optionally, the apparatus further includes a playing module, configured to:

select, in response to an audio play operation of a user, target audio corresponding to the user from the audio resource pool based on historical behavior data of the user and play the target audio.

Optionally, the playing module is further configured to:

when it is detected that an audio control included in a setting interface is triggered, determine that the audio play operation is detected, and select the target audio corresponding to the user from the audio resource pool based on the historical behavior data of the user and play the target audio.

Optionally, each piece of audio in the audio resource pool carries an audio label, and the playing module is further configured to:

determine a preferred audio type corresponding to the historical behavior data of the user; and select the target audio corresponding to the user from the audio resource pool based on the preferred audio type and the audio label of each piece of audio in the audio resource pool and play the target audio.

Optionally, the playing module is further configured to:

when it is detected that an audio control included in a video play interface of the to-be-processed video is triggered, determine that the audio play operation is detected; and select the audio corresponding to the to-be-processed video from the audio resource pool, and use the audio corresponding to the to-be-processed video as the target audio corresponding to the user and play the audio.

Optionally, the apparatus further includes a selection module, configured to:

when playing of the target audio is completed, select recommended audio associated with the target audio from the audio resource pool and play the recommended audio.

Optionally, the playing module is further configured to:

display an audio recommendation interface; and play the target audio on the audio recommendation interface, and display parameter information of the target audio.

Optionally, the playing module is further configured to:

when a slide operation in a first preset direction on the audio recommendation interface is detected, perform switching to play another piece of audio in the audio resource pool;

when a slide operation in a second preset direction on the audio recommendation interface is detected, switch the audio recommendation interface to an audio content interface, where the audio content interface includes an audio list of a target topic; and when a slide operation in a third preset direction on the audio recommendation interface is detected, switch the audio recommendation interface to a favorite interface, where the favorite interface includes a favorite video of the user.

Optionally, the playing module is further configured to:

when a first play request is detected on the audio content interface, determine a target audio list corresponding to the first play request; and sequentially obtain audio included in the target audio list from the audio resource pool and play the audio.

Optionally, the playing module is further configured to:

when a second play request is detected on the favorite interface, determine a target favorite video corresponding to the second play request; and obtain audio corresponding to the target favorite video from the audio resource pool and play the audio.

In the video processing apparatus provided in this application, the to-be-processed video may be selected from the obtained target videos. The selected to-be-processed video may be a video suitable for being played as audio alone. Then the audio in the to-be-processed video may be extracted and stored in the audio resource pool. In this way, the audio in the video can be extracted alone, and an audio play function of the video can be provided alone, so that the audio in the video can be played alone, thereby providing a video listening experience function to the user and making video display more diversified.

The foregoing describes a schematic solution of a video processing apparatus in the embodiments. It should be noted that the technical solution of the video processing apparatus and the technical solution of the foregoing video processing method belong to the same concept. For details not described in detail in the technical solution of the video processing apparatus, references can be made to the descriptions of the technical solution of the foregoing video processing method.

Figure 10:
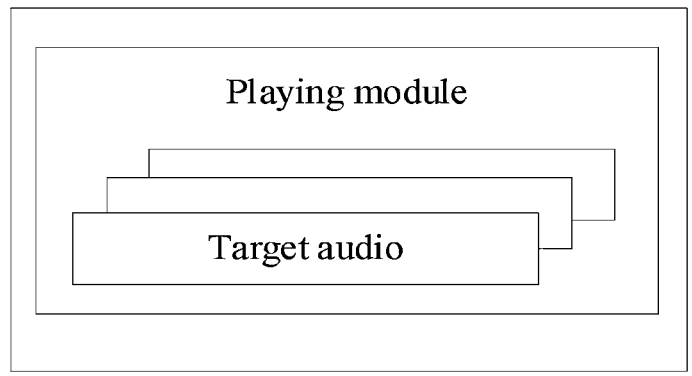
FIG. 10 is a schematic diagram illustrating a structure of another video processing apparatus according to an embodiment of this application.

Corresponding to the method embodiments, this application further provides embodiments of another video processing apparatus. FIG. 10 is a schematic diagram illustrating a structure of another video processing apparatus according to an embodiment of this application. As shown in FIG. 10, the apparatus includes:

a playing module 1002, configured to select, in response to an audio play operation of a user, target audio corresponding to the user from an audio resource pool based on historical behavior data of the user and play the target audio, where the audio resource pool is constructed by using the following method:

obtaining target videos;

selecting a to-be-processed video from the target videos based on audio features of the target videos; and extracting audio from the to-be-processed video, and storing the audio in the audio resource pool.

In the video processing apparatus provided in this application, the to-be-processed video may be selected from the obtained target videos. The selected to-be-processed video may be a video suitable for being played as audio alone. Then the audio in the to-be-processed video may be extracted and stored in the audio resource pool. In this way, the audio in the video can be extracted alone, and an audio play function of the video can be provided alone, so that the audio in the video can be played alone, thereby providing a video listening experience function to the user and making video display more diversified.

The foregoing describes a schematic solution of a video processing apparatus in the embodiments. It should be noted that the technical solution of the video processing apparatus and the technical solution of the foregoing video processing method belong to the same concept. For details not described in detail in the technical solution of the video processing apparatus, references can be made to the descriptions of the technical solution of the foregoing video processing method.

Figure 11:
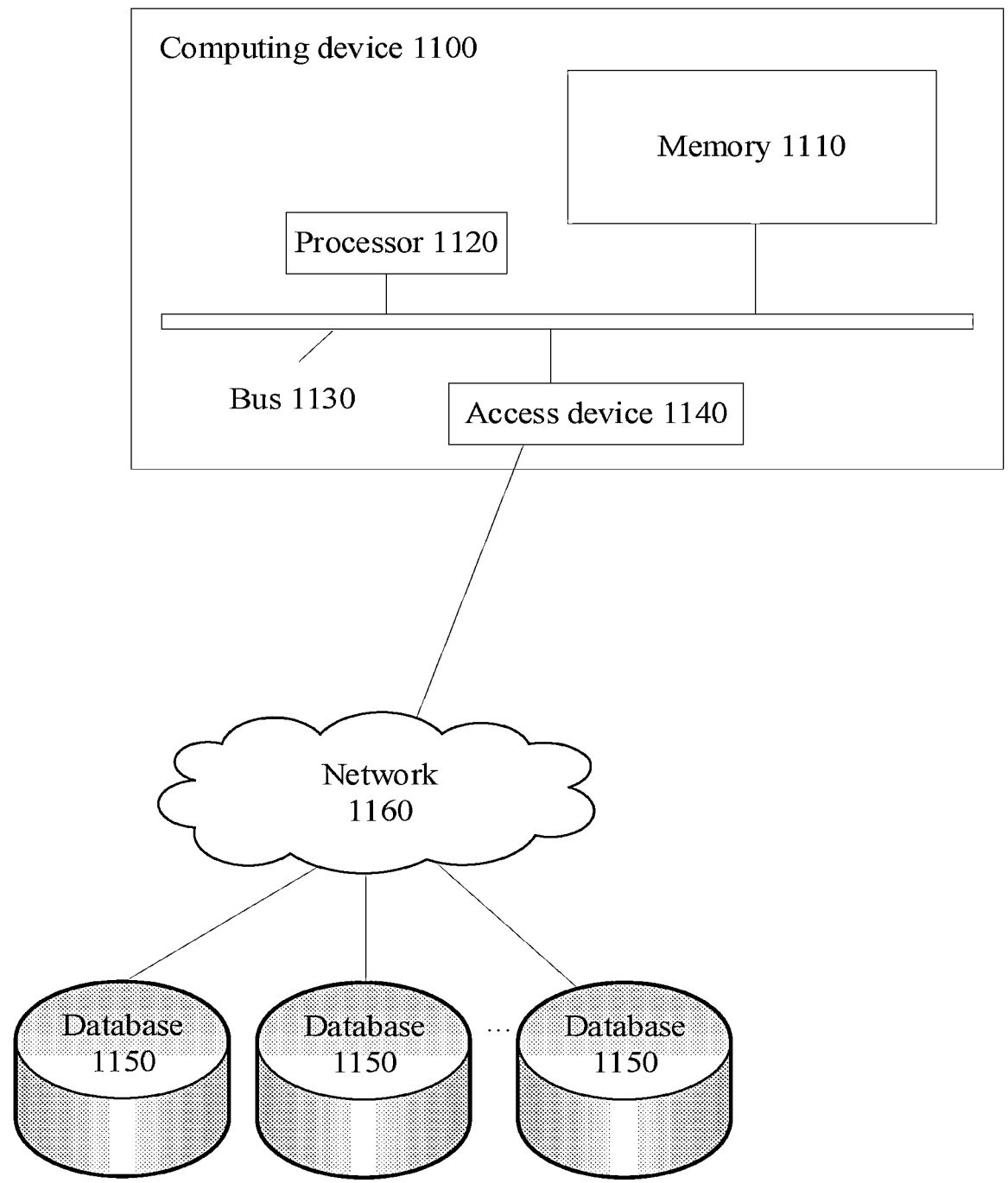
FIG. 11 is a block diagram illustrating a structure of a computing device according to an embodiment of this application.

FIG. 11 is a block diagram illustrating a structure of a computing device 1100 according to an embodiment of this application. Components of the computing device 1100 include but are not limited to a memory 1110 and a processor 1120. The processor 1120 and the memory 1110 are connected by using a bus 1130, and a database 1150 is configured to store data.

The computing device 1100 further includes an access device 1140 that enables the computing device 1100 to communicate via one or more networks 1160. Examples of these networks include a public switched telephone network (PSTN), a local area network (LAN), a wide area network (WAN), a private area network (PAN), or a combination of communications networks such as the Internet. The access device 1140 may include one or more of any type of wired or wireless network interface (for example, a network interface card (NIC)), for example, an IEEE 802.11 wireless local area network (WLAN) wireless interface, a Worldwide Interoperability for Microwave Access (WiMAX) interface, an Ethernet interface, a Universal Serial Bus (USB) interface, a cellular network interface, a Bluetooth interface, or a near field communication (NFC) interface.

In an embodiment of this application, the foregoing components of the computing device 1100 and other components not shown in FIG. 11 may also be connected to each other, for example, by using the bus. It should be understood that the block diagram illustrating the structure of the computing device shown in FIG. 11 is merely used as an example instead of a limitation on the scope of this application. A person skilled in the art may add or substitute other components as required.

The computing device 1100 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a still computing device such as a desktop computer or a PC. The computing device 1100 may be alternatively a mobile or still server.

The processor 1120 is configured to execute the following computer executable instructions to implement any step of the video processing method.

The foregoing describes a schematic solution of a computing device in the embodiments. It should be noted that the technical solution of the computing device and the technical solution of the foregoing video processing method belong to the same concept. For details not described in detail in the technical solution of the computing device, references can be made to the descriptions of the technical solution of the foregoing video processing method.

An embodiment of this application further provides a computer-readable storage medium. The computer-readable storage medium stores computer executable instructions, and the computer executable instructions are executed by a processor to implement any step of the video processing method.

The foregoing describes a schematic solution of a computer-readable storage medium in the embodiments. It should be noted that the technical solution of the storage medium and the technical solution of the foregoing video processing method belong to the same concept. For details not described in detail in the technical solution of the storage medium, references can be made to the descriptions of the technical solution of the foregoing video processing method.

Specific embodiments of this application are described above. Other embodiments fall within the scope of the appended claims. In some situations, the actions or steps recorded in the claims can be performed in an order different from the order in the embodiments and the desired results can still be achieved. In addition, the process depicted in the accompanying drawings does not necessarily require the shown particular execution order to achieve the desired results. In some implementations, multi-tasking and parallel processing can or may be advantageous.

The computer instructions include computer program code, which may be in a source code form, an object code form, an executable file, an intermediate form, or the like. The computer-readable medium may include any entity or apparatus capable of carrying the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like. It should be noted that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in the specification are all preferred embodiments, and involved actions and modules are not necessarily mandatory to this application.

In the foregoing embodiments, descriptions of the embodiments have respective focuses. For a part that is not described in detail in an embodiment, references can be made to related descriptions in another embodiment.

The preferred embodiments of this application disclosed above are merely intended to help describe this application. The optional embodiments do not describe all details, and the present invention is not limited to the specific implementations. Clearly, many modifications and changes may be made based on the content of this application. The embodiments are selected and specifically described in this application to better explain the principle and actual application of this application, so that a person skilled in the art can better understand and use this application. This application is only subjected to the claims and the scope and equivalents thereof.

What is claimed is:
1. A method, comprising:
   obtaining target videos;
   determining at least one to-be-processed video from the target videos based on audio features of the target videos;

extracting audio from the at least one to-be-processed video;

generating an audio resource pool based on the extracted audio;

in response to detecting an audio play operation of a user, determining target audio corresponding to the user from the audio resource pool based on historical behavior data of the user;

playing the target audio while displaying parameter information of the target audio on an audio recommendation interface;

in response to detecting a first sliding operation performed in a first preset direction on the audio recommendation interface, switching to play another piece of audio in the audio resource pool;

in response to detecting a second sliding operation performed in a second preset direction on the audio recommendation interface, switching the audio recommendation interface to an audio content interface, wherein the audio content interface comprises at least one audio list of listing audio with a target topic; and in response to detecting a third sliding operation performed in a third preset direction on the audio recommendation interface, switching the audio recommendation interface to a favorite interface, wherein the favorite interface comprises at least one favorite video of the user.

2. The method according to claim 1, wherein the obtaining target videos further comprises:

obtaining uploaded videos, and identifying the uploaded videos as the target videos; or obtaining uploaded videos, and selecting the target videos from the obtained uploaded videos based on a video content rule.

3. The method according to claim 1, further comprises:

detecting the audio play operation of the user in response to determining that an audio control in a setting interface is triggered by the user.

4. The method according to claim 1, wherein each piece of audio in the audio resource pool carries an audio label, and wherein the determining target audio corresponding to the user from the audio resource pool based on historical behavior data of the user further comprises:

determining at least one preferred type of audio based on the historical behavior data of the user; and determining the target audio corresponding to the user from the audio resource pool based on the at least one preferred type of audio and the audio label of each piece of audio in the audio resource pool.

5. The method according to claim 1, further comprising:

detecting the audio play operation of the user in response to determining that an audio control in a video play interface of the at least one to-be-processed video is triggered by the user; and identifying the audio corresponding to the at least one to-be-processed video as the target audio.

6. The method according to claim 1, further comprising:

in response to determining a completion of playing the target audio, identifying at least one piece of recommended audio associated with the target audio from the audio resource pool; and playing the at least one piece of recommended audio.

7. The method according to claim 1, further comprising:

generating and displaying the audio recommendation interface.

8. The method according to claim 1, after the switching the audio recommendation interface to an audio content interface, further comprising:

in response to detecting a first play request on the audio content interface, determining a target audio list corresponding to the first play request; and sequentially obtaining pieces of audio comprised in the target audio list from the audio resource pool and sequentially playing the pieces of audio comprised in the target audio list.

9. The method according to claim 1, after the switching the audio recommendation interface to a favorite interface, further comprising:

in response to detecting a second play request on the favorite interface, determining a target favorite video corresponding to the second play request;

obtaining audio corresponding to the target favorite video from the audio resource pool; and playing the audio corresponding to the target favorite video.

10. A system, comprising:

at least one processor; and at least one memory comprising computer-readable instructions that upon execution by the at least one processor cause the system to perform operations comprising:

obtaining target videos;

determining at least one to-be-processed video from the target videos based on audio features of the target videos;

extracting audio from the at least one to-be-processed video;

generating an audio resource pool based on the extracted audio;

in response to detecting an audio play operation of a user, determining target audio corresponding to the user from the audio resource pool based on historical behavior data of the user;

playing the target audio while displaying parameter information of the target audio on an audio recommendation interface;

in response to detecting a first sliding operation performed in a first preset direction on the audio recommendation interface, switching to play another piece of audio in the audio resource pool;

in response to detecting a second sliding operation performed in a second preset direction on the audio recommendation interface, switching the audio recommendation interface to an audio content interface, wherein the audio content interface comprises at least one audio list of listing audio with a target topic; and in response to detecting a third sliding operation performed in a third preset direction on the audio recommendation interface, switching the audio recommendation interface to a favorite interface, wherein the favorite interface comprises at least one favorite video of the user.

11. The system according to claim 10, the operations further comprising:

detecting the audio play operation of the user in response to determining that an audio control in a setting interface is triggered by the user; or detecting the audio play operation of the user in response to determining that an audio control in a video play interface of the at least one to-be-processed video is triggered by the user.

12. The system according to claim 10, wherein each piece of audio in the audio resource pool carries an audio label, and wherein the determining target audio corresponding to the user from the audio resource pool based on historical behavior data of the user further comprises:
 determining at least one preferred type of audio based on the historical behavior data of the user; and
 determining the target audio corresponding to the user from the audio resource pool based on the at least one preferred type of audio and the audio label of each piece of audio in the audio resource pool.

13. The system according to claim 10, the operations further comprising:
 generating and displaying the audio recommendation interface.

14. A non-transitory computer-readable storage medium, storing computer-readable instructions that upon execution by a processor cause the processor to implement operations, the operation comprising:
 obtaining target videos;
 determining at least one to-be-processed video from the target videos based on audio features of the target videos;
 extracting audio from the at least one to-be-processed video;
 generating an audio resource pool based on the extracted audio;
 in response to detecting an audio play operation of a user, determining target audio corresponding to the user from the audio resource pool based on historical behavior data of the user;
 playing the target audio while displaying parameter information of the target audio on an audio recommendation interface;
 in response to detecting a first sliding operation performed in a first preset direction on the audio recommendation interface, switching to play another piece of audio in the audio resource pool;
 in response to detecting a second sliding operation performed in a second preset direction on the audio recommendation interface, switching the audio recommendation interface to an audio content interface, wherein the audio content interface comprises at least one audio list of listing audio with a target topic; and
 in response to detecting a third sliding operation performed in a third preset direction on the audio recommendation interface, switching the audio recommendation interface to a favorite interface, wherein the favorite interface comprises at least one favorite video of the user.

15. The system according to claim 10, wherein after switching the audio recommendation interface to the audio content interface, the operations further comprise:
 in response to detecting a first play request on the audio content interface, determining a target audio list corresponding to the first play request; and
 sequentially obtaining pieces of audio comprised in the target audio list from the audio resource pool and sequentially playing the pieces of audio comprised in the target audio list.

16. The system according to claim 10, wherein after switching the audio recommendation interface to the favorite interface, the operations further comprise:
 in response to detecting a second play request on the favorite interface, determining a target favorite video corresponding to the second play request;
 obtaining audio corresponding to the target favorite video from the audio resource pool; and
 playing the audio corresponding to the target favorite video.

17. The non-transitory computer-readable storage medium according to claim 14, the operations further comprising:
 detecting the audio play operation of the user in response to determining that an audio control in a setting interface is triggered by the user; or
 detecting the audio play operation of the user in response to determining that an audio control in a video play interface of the at least one to-be-processed video is triggered by the user.

18. The non-transitory computer-readable storage medium according to claim 14, wherein each piece of audio in the audio resource pool carries an audio label, and wherein the determining target audio corresponding to the user from the audio resource pool based on historical behavior data of the user further comprises:
 determining at least one preferred type of audio based on the historical behavior data of the user; and
 determining the target audio corresponding to the user from the audio resource pool based on the at least one preferred type of audio and the audio label of each piece of audio in the audio resource pool.

19. The non-transitory computer-readable storage medium according to claim 14, wherein after switching the audio recommendation interface to the audio content interface, the operations further comprise:
 in response to detecting a first play request on the audio content interface, determining a target audio list corresponding to the first play request; and
 sequentially obtaining pieces of audio comprised in the target audio list from the audio resource pool and sequentially playing the pieces of audio comprised in the target audio list.

20. The non-transitory computer-readable storage medium according to claim 14, wherein after switching the audio recommendation interface to the favorite interface, the operations further comprise:
 in response to detecting a second play request on the favorite interface, determining a target favorite video corresponding to the second play request;
 obtaining audio corresponding to the target favorite video from the audio resource pool; and
 playing the audio corresponding to the target favorite video.

\* \* \* \* \*